United States Patent [19]

Kasik

[11] Patent Number: 4,836,360

[45] Date of Patent: Jun. 6, 1989

[54] CONTINUOUS PROOFING AND BAKING APPARATUS HAVING MAGNETIC CONVEYOR SYSTEM

[75] Inventor: John P. Kasik, Dallas, Tex.

[73] Assignee: Stewart Systems, Inc., Plano, Tex.

[21] Appl. No.: 59,600

[22] Filed: Jun. 8, 1987

[51] Int. Cl.⁴ ............................................. B65G 29/00
[52] U.S. Cl. ............................. 198/803.6; 198/803.01; 198/690.1
[58] Field of Search ................ 198/472.1, 474.1, 778, 198/690.1, 802, 803.6, 803.01, 689.1, 803.5, 803.11, 471.1, 473.1, 850, 851, 852, 838, 470.1, 803.12, 697, 476.1, 477.1, 845; 99/477, 478, 479

[56] References Cited

U.S. PATENT DOCUMENTS

| | | | |
|---|---|---|---|
| 3,094,206 | 6/1963 | Stewert et al. | 198/851 X |
| 3,285,394 | 11/1966 | Lanham et al. | 198/838 X |
| 3,367,474 | 2/1968 | Kerr et al. | 198/831 X |
| 3,570,651 | 3/1971 | Lanhem et al. | 198/778 |
| 3,680,493 | 8/1972 | Lanham et al. | 198/845 X |
| 4,004,681 | 1/1977 | Clewett et al. | 198/802 X |
| 4,181,215 | 1/1980 | Carpenter | 198/477.1 |
| 4,301,915 | 11/1981 | Michalik et al. | 198/851 |
| 4,544,060 | 10/1985 | Enomoto | 198/690.1 |
| 4,586,601 | 5/1986 | Hodlewsky | 198/690.1 |
| 4,729,470 | 3/1988 | Bacigalupe et al. | 198/838 |
| 4,760,911 | 8/1988 | Bacigalupe et al. | 198/474.1 |

FOREIGN PATENT DOCUMENTS 2402242 1/1974 Fed. Rep. of Germany ... 198/690.1

Primary Examiner—Robert J. Spar
Assistant Examiner—Cheryl L. Gastineau
Attorney, Agent, or Firm—Michael A. O'Neil

[57] ABSTRACT

A conveyor system for use in a continuous proofing and baking apparatus. The system has a conveyor chain, having a plurality of links, which moves along a track. Each link supports a product supporting grid, which has four circular rings. Pole pieces are located in at least some of the rings. Each pole piece has a conical section and can move horizontally relative to the grid. A magnet in each pole piece attaches the pole piece to a product pan.

13 Claims, 3 Drawing Sheets

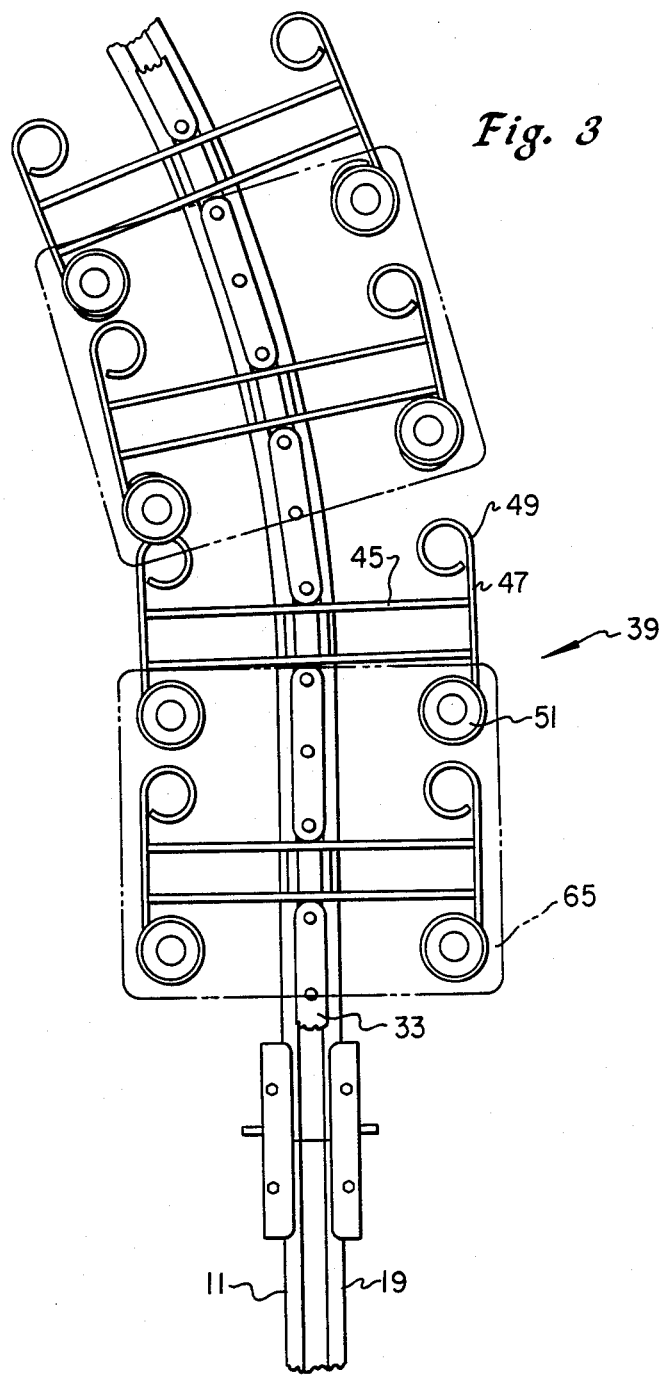

CONTINUOUS PROOFING AND BAKING APPARATUS HAVING MAGNETIC CONVEYOR SYSTEM

BACKGROUND OF THE INVENTION

1. Field of the Invention

This invention relates in general to a continuous proofing and baking apparatus for use in a bakery. In particular, the invention relates to a continuous proofing and baking apparatus having an improved conveyor system for carrying product pans through the proofing and baking apparatus.

2. Description of the Prior Art

In the commercial baking industry, dough products are exposed to a predetermined temperature and humidity environment to cause the dough to rise. Following this proofing operation, the dough products are transferred to an oven for baking.

The dough products may be conveyed from the proofing apparatus to the oven on a continuous conveyor system. The conveyor system has an elongated track which extends through and between the proofing and baking sections of the apparatus. A conveyor chain, having a plurality of links, moves through the elongated track and carries a plurality of product supporting grids. Each product pan is supported by one or more product supporting grids.

As the conveyor chain moves through the proofing and baking apparatus, the track has some straight portions and some curved portions. As the conveyor chain travels from a straight portion to a curved portion of the track, the relative positions of two consecutive product supporting grids will change. The conveyor system must be able to support the product pans, even though the relative positions of the product supporting grids change.

SUMMARY OF THE INVENTION

The conveyor system of the invention is designed for use in a continuous proofing and baking apparatus. The conveyor system has a conveyor chain, having a plurality of links, for movement through an elongated track. Each of the links of the conveyor chain supports a product supporting grid. Each grid has at least one circular ring. A pole piece, having a conical section, is located in the rings so that the pole piece can move horizontally relative to the product supporting grid.

A magnet is located on the pole piece in order to connect a product pan to the pole piece. The magnet attaches to the bottom of the product pan and releasably connects the pan to the pole piece.

As the conveyor chain moves around a curve in the elongated track, the relative positions of two consecutive product supporting grids change. The corresponding changes in position between the pole pieces and the product supporting grids allow the conveyor system to carry product pans around curves in the elongated track.

BRIEF DESCRIPTION OF THE DRAWINGS

FIG. 3 is a top view of the conveyor system of the invention.

DESCRIPTION OF THE PREFERRED EMBODIMENT

Figure 1:
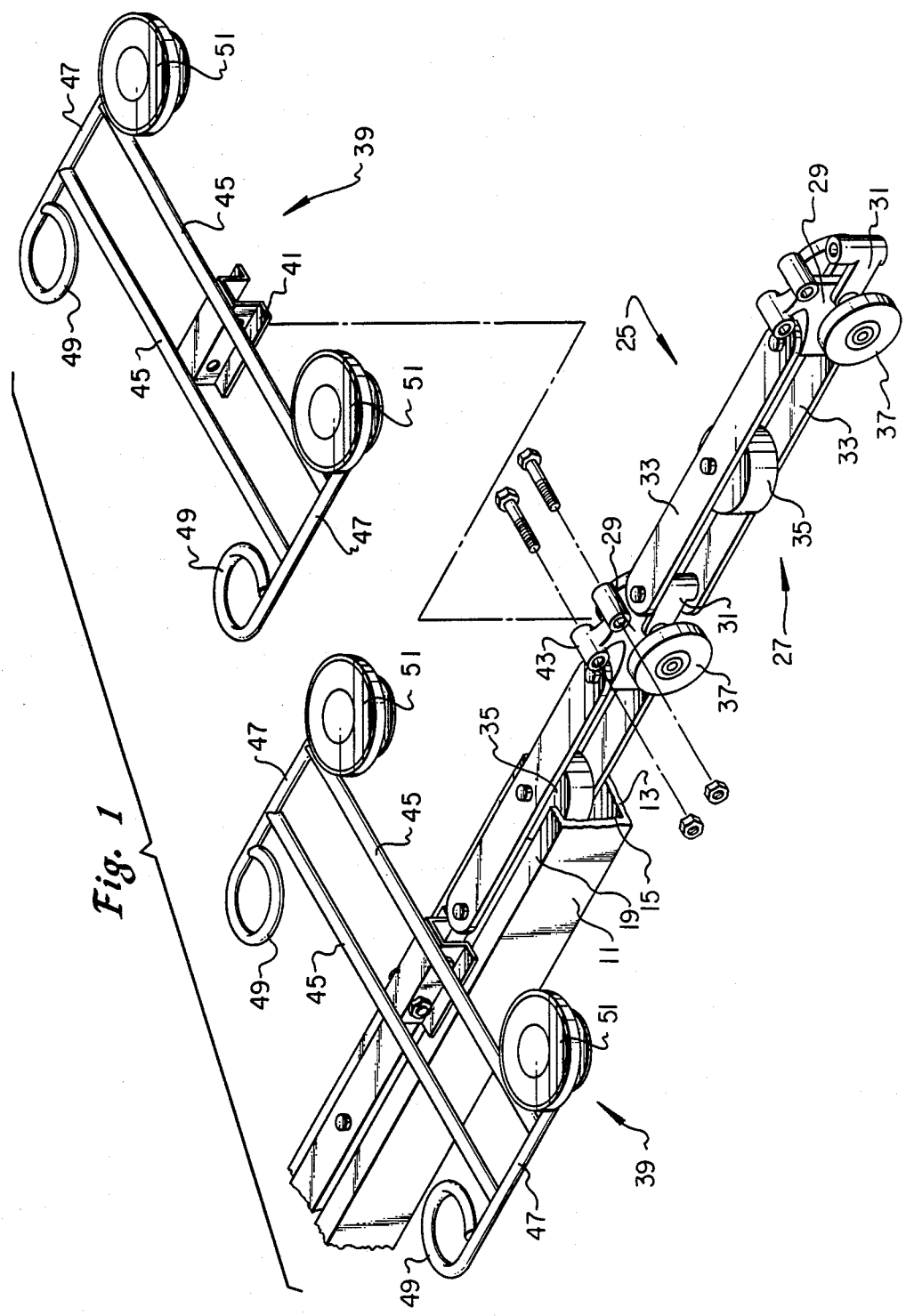
FIG. 1 is a perspective view of the conveyor system of the invention.
Figure 2:
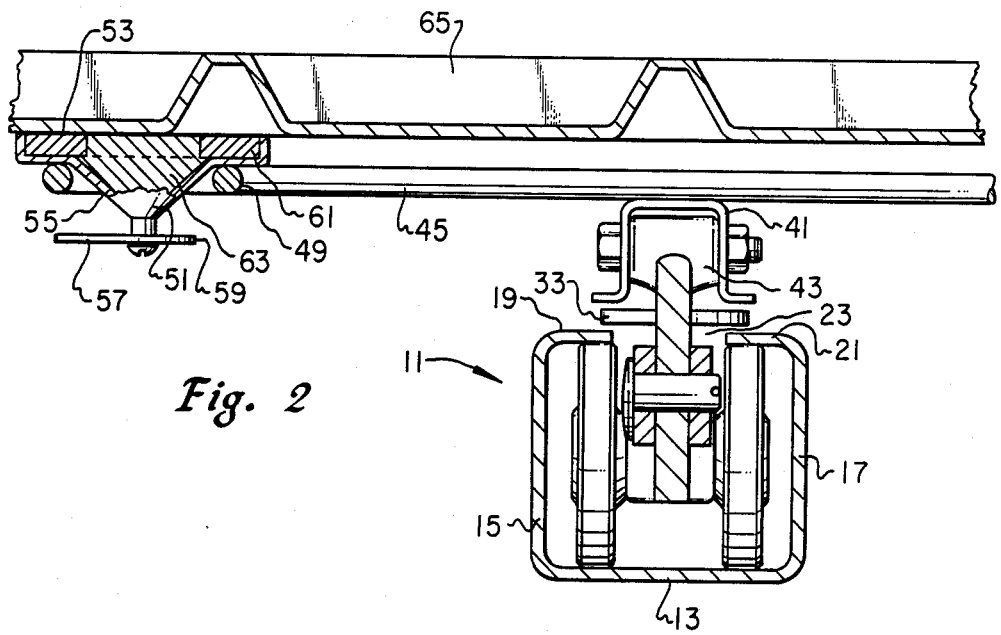
FIG. 2 is a sectional view of the conveyor system of the invention, as seen along lines 2—2 in FIG. 3.

As shown in FIGS. 1 and 2, the conveyor system of the invention includes an elongated track 11. The track 11 has a bottom 13, two sides 15, 17, and two top pieces 19, 21. There is a longitudinal gap 23 between the two top pieces 19, 21.

A conveyor chain 25, having a plurality of links 27, is mounted for movement through the track 11. Each link 27 has a first connection member 29 and a second connection member 31. A pair of vertically spaced, parallel, longitudinal plates 33 extend between the first and second connection members 29, 31. As shown in FIG. 2, the upper plate 33 is located above the gap 23, in order to help keep debris from falling into the track 11.

A horizontal roller 35 is mounted between the two plates 33 to keep the conveyor chain 25 centered within the track 11. A pair of vertical rollers 37 are attached to each first connection member 29 to support the weight of the conveyor chain 25.

As shown in FIGS. 1 and 2, a product supporting grid 39 is attached to each first connection member 29. Each product supporting grid 39 has a cover member 41, which is bolted to a pair of bosses 43 which extend upward from the first connection member 29.

Each product supporting grid 39 has a pair of laterally extending rods 45. A pair of longitudinally extending rods 47 are connected to each end of the laterally extending rods 45. The ends of each longitudinal rod 47 are curved to form a circular ring 49. The four rings 49 are thus located on the four corners of the product supporting grid 39.

At least some of the rings 49 contain pole pieces 51. Each pole piece 51 has an upper circular portion 53, and a lower conical portion 55. The circular portion 53 has a larger diameter than the ring 49, but the conical portion 55 fits within the ring 49.

The pole piece 51 is secured within the ring 49 by locking means, such as a circular washer 57. The washer 57 may be removable from the lower end of the conical portion 55, or the washer 57 may have a flat 59 or a shaped notch, so that the washer 57 can be maneuvered through the ring 49.

The circular portion 53 of the pole piece 51 contains a ring magnet 61. The portion of the circular portion 53 not occupied by the washer 57 may be filled in with a compound 63 or covered with a cap. This compound filler 63 or cap keeps debris from accumulating within the circular portion 53 of the pole piece 51.

A product pan 65 may be supported by the pole pieces 51. The metal product pan 65 is held to the pole pieces 51 by the magnets 61. As shown in FIG. 2, the product pan 65 is not in contact with the lateral or longitudinal rods 45, 47 of the product supporting grid 39.

FIG. 3 illustrates a portion of the conveyor chain 25 going around a curve in the track 11. Typically, a product pan 65 is large enough to be supported by two consecutive product supporting grids 39. Therefore, pole pieces 51 are located only in the forward pair of rings 49. If a smaller product pan 65 is used, pole pieces 51 may need to be located in all four rings 49 of each product supporting grid 39.

As a pair of product supporting grids 39 enter a curve in the track 11, the rings 49 on the inside of the curve move closer together, and the rings 49 on the outside of the curve move further apart. For example, the distance from a pole piece 51 in one product supporting grid 39 will typically be 12.5 inches from the pole piece 51 in the next product supporting grid 39. As the product supporting grids 39 enter the curve, the pole pieces 51 on the inside of the curve will move to 11 inches apart, while the rings 49 on the outside of the curve will move to 14 inches apart.

Figure 4:
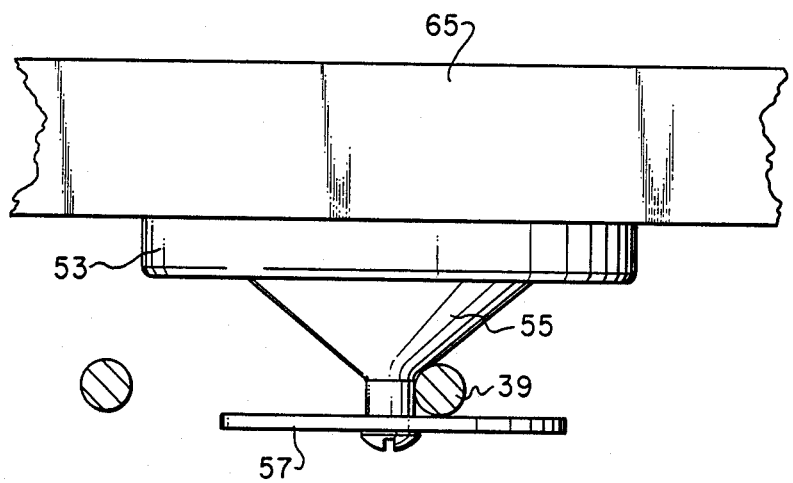
FIG. 4 is a partial side view, partly in section, of a pole piece of the invention.

While the rings 49 are moving relative to one another, the magnets 61 in the pole pieces 51 are attached to the product pan 65, and cannot move relative to one another. Therefore, the pole pieces 51 must move horizontally relative to the rings 49. FIGS. 3 and 4 illustrate how the pole pieces 51 move horizontally relative to the rings 49. As the product supporting grid 39 enters a curve, and the rings 39 move relative to one another, a horizontal force will be applied to the pole pieces 51. The pole pieces 51 are raised vertically slightly as the conical portion 55 of the pole piece 51 moves up on the ring 39. The dimensions of the conical portion 55 are such that the pole piece 51 can move approximately 0.75 inches in any horizontal direction.

When the product supporting grids 39 reenter a straight portion of the track 11, the rings 39 move back to the original position relative to one another. The horizontal force on the pole pieces 51 is removed, and the pole pieces 51 settle back down to their original positions. The conical portion 55 of the pole piece 51 causes the pole piece 51 to return to a centered position within the ring 39.

The conveyor system of the invention has several advantages over the prior art. The product pan 65 is securely fastened to the product supporting grid 39, and yet no horizontal forces are applied to the pans 65 as the pans go around a curve in the track 11. Further, since the product pan 65 is supported by the pole pieces 51 there is no friction against the product supporting grid 39.

Only the preferred embodiment of the invention has been shown. It should be understood that the invention is subject to various rearrangements, modifications, and substitutions without departing from the scope of the invention.

I claim:

1. A conveyor system for use in a continuous proofing and baking apparatus, the conveyor system comprising:
    an elongated track;
    a conveyor chain, mounted for movement through the track;
    a product supporting grid, carried along the track by the conveyor chain;
    a pole piece;
    means for mounting the pole piece on the product supporting grid, so that the pole piece can move a limited distance in any horizontal direction relative to the supporting grid; and
    connection means for releasably connecting a product pan to the pole piece.

2. A conveyor system as recited in claim 1, wherein the connection means is a magnet.

3. A conveyor system as recited in claim 2, further comprising locking means for locking the pole piece to the product supporting grid.

4. A conveyor system for use in a continuous proofing and baking apparatus, the conveyor system comprising:
    an elongated track;
    a conveyor chain, mounted for movement through the track;
    a product supporting grid, carried along the track by the conveyor chain;
    a ring carried by the product supporting grid;
    a pole piece, mounted within the ring, so that the pole piece can move horizontally a limited distance with respect to the ring; and
    connection means for releasably connecting a product pan to the pole piece.

5. A conveyor system as recited in claim 4, further comprising a conical portion on the pole piece, so that the pole piece tends to settle to a centered position within the ring.

6. A conveyor system as recited in claim 4, wherein the connection means is a magnet.

7. A conveyor system as recited in claim 4, further comprising locking means for locking the pole piece within the ring.

8. A conveyor system as recited in claim 7, wherein the locking means is a washer, mounted on the lower end of the conical portion.

9. A conveyor system as recited in claim 8, wherein the washer has a flat on one side, so that the pole piece can be removed from the ring.

10. A conveyor system for use in continuous proofing and baking apparatus, the conveyor system comprising:
    an elongated track;
    a conveyor chain, having a plurality of links, mounted for movement through the track;
    a plurality of product supporting grids, each carried along the track by one of the links of the conveyor chains;
    a plurality of rings carried by each of the product supporting grids;
    a plurality of pole pieces, each pole piece having a conical portion mounted within one of the rings, so that the pole pieces can move horizontally a limited distance with respect to the ring, and so that the pole pieces tend to settle to a centered position within the ring;
    a plurality of washers, each having a flat on one side, for releasably locking the pole pieces within the rings; and
    connection means for releasably connecting a product pan to the pole pieces on two consecutive product supporting grids.

11. A conveyor system as recited in claim 10, wherein the connection means is a plurality of magnets.

12. A conveyor system as recited in claim 11, wherein the plurality of magnets are attached to the product pan for movement with the pan relative to the product supporting grids.

13. A conveyor system as recited in claim 12, wherein the plurality of magnets are attached to the pole pieces for movement with the pole pieces relative to the product supporting grids.

* * * * *